United States Patent [19]
Hirabayashi et al.

[11] Patent Number: 5,630,767
[45] Date of Patent: May 20, 1997

[54] AUTO-TENSIONER

[75] Inventors: Katsumi Hirabayashi, Anjo; Yukimori Kobayashi, Gamagori, both of Japan

[73] Assignee: Aisin Seiki Kabushiki Kaisha, Aichi-pref., Japan

[21] Appl. No.: 578,313

[22] Filed: Dec. 26, 1995

[30] Foreign Application Priority Data

Dec. 26, 1994 [JP] Japan ..................... 6-323105

[51] Int. Cl.$^6$ ..................................... F16H 7/08
[52] U.S. Cl. ............................. 474/110; 474/135
[58] Field of Search ..................... 474/101, 110, 474/133, 135

[56] References Cited

U.S. PATENT DOCUMENTS

| | | | |
|---|---|---|---|
| 4,713,044 | 12/1987 | Nakamura et al. | 474/135 |
| 4,904,230 | 2/1990 | Kawashima et al. | 474/135 X |
| 4,969,858 | 11/1990 | Hertrich et al. | 474/117 X |
| 5,186,689 | 2/1993 | Yamamoto et al. | 474/117 X |

FOREIGN PATENT DOCUMENTS

| | | |
|---|---|---|
| 5-27405 | 9/1993 | Japan . |
| 2252388 | 8/1992 | United Kingdom . |
| 2252389 | 8/1992 | United Kingdom . |
| 2258287 | 2/1993 | United Kingdom . |
| 2263150 | 7/1993 | United Kingdom . |

*Primary Examiner*—Roger J. Schoeppel
*Attorney, Agent, or Firm*—Hazel & Thomas, P.C.

[57] ABSTRACT

An auto-tensioner including a body having a cylindrical bore defined therein; a shaft having first and second ends, the first end of the shaft being slidably and rotatably engaged with the cylindrical bore of the body, the body including a mechanism for sealing the shaft in the cylindrical bore so as to be fluid-tight; a support arm having upper and lower ends, the lower end of the support arm being fixedly connected to the second end of the shaft; a pulley rotatably connected to the upper end of the support arm, the pulley being operatively engaged with a belt under tension; a mechanism for rotatively urging the shaft and the support arm whereby the support arm maintains a tension engagement between the pulley and the belt, the urging mechanism being operatively connected between the body and the shaft; and a mechanism for converting rotational movement of the shaft into axial movement thereof along the cylindrical bore, the converting mechanism operatively connected between the shaft and the body, wherein the cylindrical bore includes an inner end and an outer end, the inner end of the cylindrical bore being formed so as to define a pressure chamber and a fluid chamber between the inner end of the cylindrical bore and the first end of the shaft, the pressure and fluid chambers are further formed so as to define a narrow fluid passage therebetween, the pressure and fluid chambers are filled with a viscous fluid, the body has a reservoir chamber defined therein and formed so as to be located above the pressure and fluid chambers, the reservoir chamber is filled with viscous fluid and gas, a first main fluid passage is defined in the body to communicatively connect the pressure chamber with the reservoir chamber, and a second main fluid passage is defined in the body to communicatively connect the fluid chamber with the reservoir chamber; and a valve mechanism located in the first fluid passage for selectively controlling fluid communication of the pressure and fluid chambers with each other and with the reservoir chamber.

5 Claims, 3 Drawing Sheets

AUTO-TENSIONER

BACKGROUND OF THE INVENTION

1. Field of the Invention

The present invention relates to an auto-tensioner and, more particularly, to an auto-tensioner that incorporates a pulley elastically supporting a belt.

2. Description of the Prior Art

One example of a conventional auto-tensioner is disclosed in Japanese Utility Model Application Laid-Open Publication Number 5-27405. This auto-tensioner includes a fixed shaft and an oscillatory motion member which is rotatably supported on the fixed shaft so as to be eccentrically movable about the fixed shaft and which has a cylindrical base portion. A pulley is rotatably supported on a shaft portion of the oscillatory motion member which is in parallel with the fixed shaft. A spring presses the pulley onto a belt in order to apply tension to the belt. A sealed space is formed between the base portion of the oscillatory motion member and an outer circumferential surface of the fixed shaft; the sealed space is filled with viscous fluid. A partition wall member divides the sealed space into two spaces in the axial direction. A first engaging means is provided between the partition wall member and the fixed shaft while a second engaging means is provided between the partition wall member and the oscillatory motion member. A passage is formed on the partition wall member and communications between the two spaces of the sealed space and a check valve which is disposed in the passage. The check valve opens the passage when the pulley is moved by the elastic force of the spring and closes the passage when the pulley is moved against the elastic force of the spring. Either the first engaging means or the second engaging means is used to make the partition wall member engage the fixed shaft or the oscillatory motion member so that the partition wall member can move relative to the fixed shaft of the oscillatory motion member only in the axial direction. The other of the first engaging means and the second engaging means then includes an inclination portion inclined in the axial and the circumferential directions and an engaging projection engaged with the inclination portion. The other of the first and second engaging means further makes the partition wall member move in the axial direction. When the rotational force is applied to the oscillatory motion member, the oscillatory motion member rotates relative to the partition wall member. Alternatively, when the rotational forces is applied to the partition wall member, the partition wall member rotates relative to the fixed shaft.

When the oscillatory motion member moves following the vibration of the belt pressed by the pulley, the partition wall member is axially moved in the sealed space. The belt has a tendency to be strained when the pulley is moved against the elastic force of the spring, whereby the check valve keeps the passage of the partition wall member closed. As a result, a large resistance is generated on the partition wall member which must move in the sealed space filled with the viscous fluid and the partition wall member can move only gradually. Accordingly, the pulley gradually follows the movement of the belt whose tension suddenly increased. In the process, other portions of the belt are prevented from becoming excessively loose. However, when the belt does become loose rapidly, namely when the pulley is moved by the elastic force of the spring, the check valve is opened so that the two spaces of the sealed space communicate through the passage with each other and the resistance against the movement of the partition wall member in the sealed space becomes small. As a result, the oscillatory motion member is moved by the elastic force of the spring and the pulley compensates for and follows the looseness of the belt.

In the above-mentioned prior auto-tensioner, since the sealed space is filled with the viscous fluid, the pressure of the viscous fluid in the sealed space increases with changes in the volume of the viscous fluid due to a change in temperature. When this occurs, there is the danger that seal portions of the sealed space will eventually be destroyed.

Furthermore, when the check valve is closed, viscous fluid flows through either the engaging means or the second engaging means, allowing the partition wall member to move axially relative to the fixed shaft or the oscillatory motion member. Also, the partition wall member is moved slowly in the axial direction. However, since either the first engaging means or the second engaging means slides while receiving the load in the circumferential direction when the oscillatory motion member moves, the engaging means receiving the load will more easily wear down. Consequently, when the engaging means receiving the load does down, the amount of flowing viscous fluid will change and, therefore, the above-discussed characteristics of the auto-tensioner will change.

SUMMARY OF THE INVENTION

It is, therefore, an object of the present invention to provide an improved auto-tensioner which overcomes the above drawbacks.

It is another object of the present invention to provide an auto-tensioner which can improve the durability of the seal portion for sealing viscous fluid and which can prevent changes in the characteristics of the auto-tensioner during its use.

In order to achieve these objectives, there is provided an auto-tensioner which includes a body having an inner bore, a shaft slidably and rotatably fitted in the inner bore of the body to be fluid-tight, an arm connected with a portion of the shaft that is projected from the inner bore so as to allow the shaft to axially move and not allow relative rotation therebetween, a pulley rotatably supported on the arm and supporting a belt, and urging means for urging the arm so that the pulley is pressed onto the belt and disposed between the shaft and the body. A pressure chamber and a fluid chamber are formed in the inner bore of the body by the shaft and communicate with each other through a small passage formed therebetween. Viscous fluid is filled up in the chambers. A converting means for converting rotational movement of the shaft into an axial movement of the shaft is formed between the shaft and the body so as to be separated from the small passage in the axial direction. A reservoir chamber is formed in the body so as to be located above the pressure chamber and the fluid chamber and into which the viscous fluid and gas fill up. The reservoir chamber communicates with the fluid chamber. A passage is formed to communicate the pressure chamber with the fluid chamber or the reservoir chamber, and a check valve is disposed in the passage so as to interrupt the fluid communication from the pressure chamber to the fluid chamber or the reservoir chamber through the passage. The check valve allows fluid communication from the fluid chamber or the reservoir chamber to the pressure chamber through the passage.

According to the above-improved auto-tensioner, the arm is urged toward the belt by the urging means so that the pulley is pressed onto the belt and thereby proper tension is given to the belt. When the arm is moved by the vibration of the belt pressing the pulley, the shaft is rotated relative to the body. At that point, the shaft slides in the axial direction through the converting means. When the belt is strained, the shaft slides in one direction so that the pressure chamber is pressurized. Since the fluid communication from the pressure chamber to the fluid chamber or the reservoir chamber through the passage is closed by the check valve, the viscous fluid in the pressure chamber slowly flows into the fluid chamber only through the small passage. As a result, a large amount of resistance acts on the shaft and therefore the movement of the shaft and the arm occurs slowly. Accordingly, the pulley gradually follows the movement of the belt whose tension is suddenly increased, thereby preventing other portions of the belt from becoming excessively loose. On the other hand, if the belt loosens rapidly, the shaft slides in the opposite direction so as to expand the pressure chamber. Since fluid communication from the fluid chamber or the reservoir chamber to the pressure chamber through the passage is opened by the check valve, the resistance against the movement of the shaft becomes less. Consequently, the arm quickly moves by the urging force of the urging means, and the pulley quickly reacts to the looseness of the belt.

Since gas and viscous fluid fill up into the reservoir chamber which communicates with the fluid chamber and is located above both the pressure chamber and the fluid chamber, the gas stays in the reservoir chamber. The change in the volume of the viscous fluid due to a change in temperature and a change in the volume of the pressure or fluid chamber caused by the movement of the shaft is absorbed by the gas in the reservoir chamber. Accordingly, a large amount of pressure from the viscous fluid is not exerted on the seal member.

BRIEF DESCRIPTION OF THE DRAWINGS

Additional objects and advantages of the present invention will become more apparent from the following detailed description of the preferred embodiments when considered with reference to the attached drawings, in which.

DESCRIPTION OF THE PREFERRED EMBODIMENTS

An auto-tensioner constituted in accordance with preferred embodiments of the present invention will be described with reference to the attached drawings.

Figure 1:
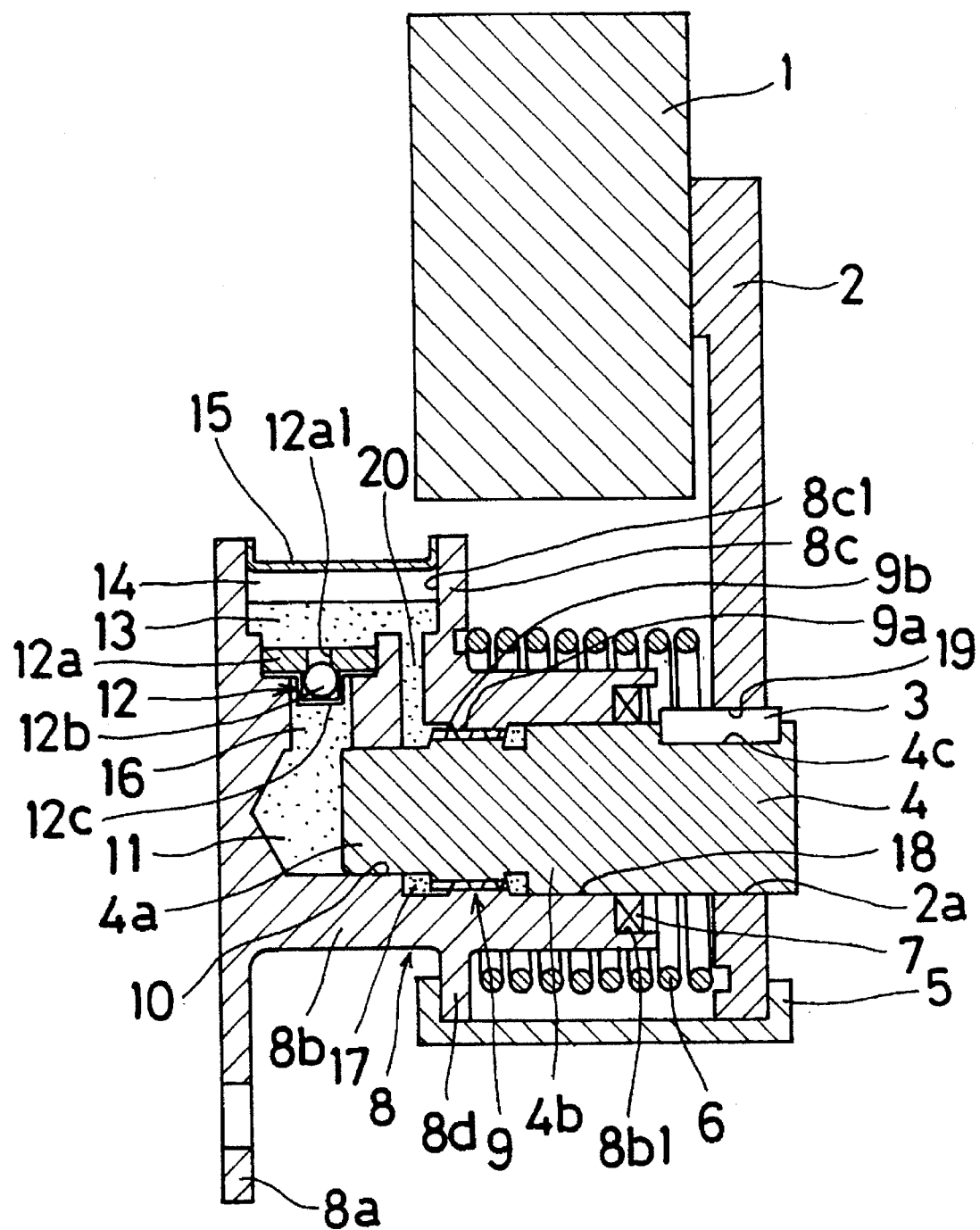
FIG. 1 is a sectional view of a first embodiment of an auto-tensioner in accordance with the present invention.
Figure 2:
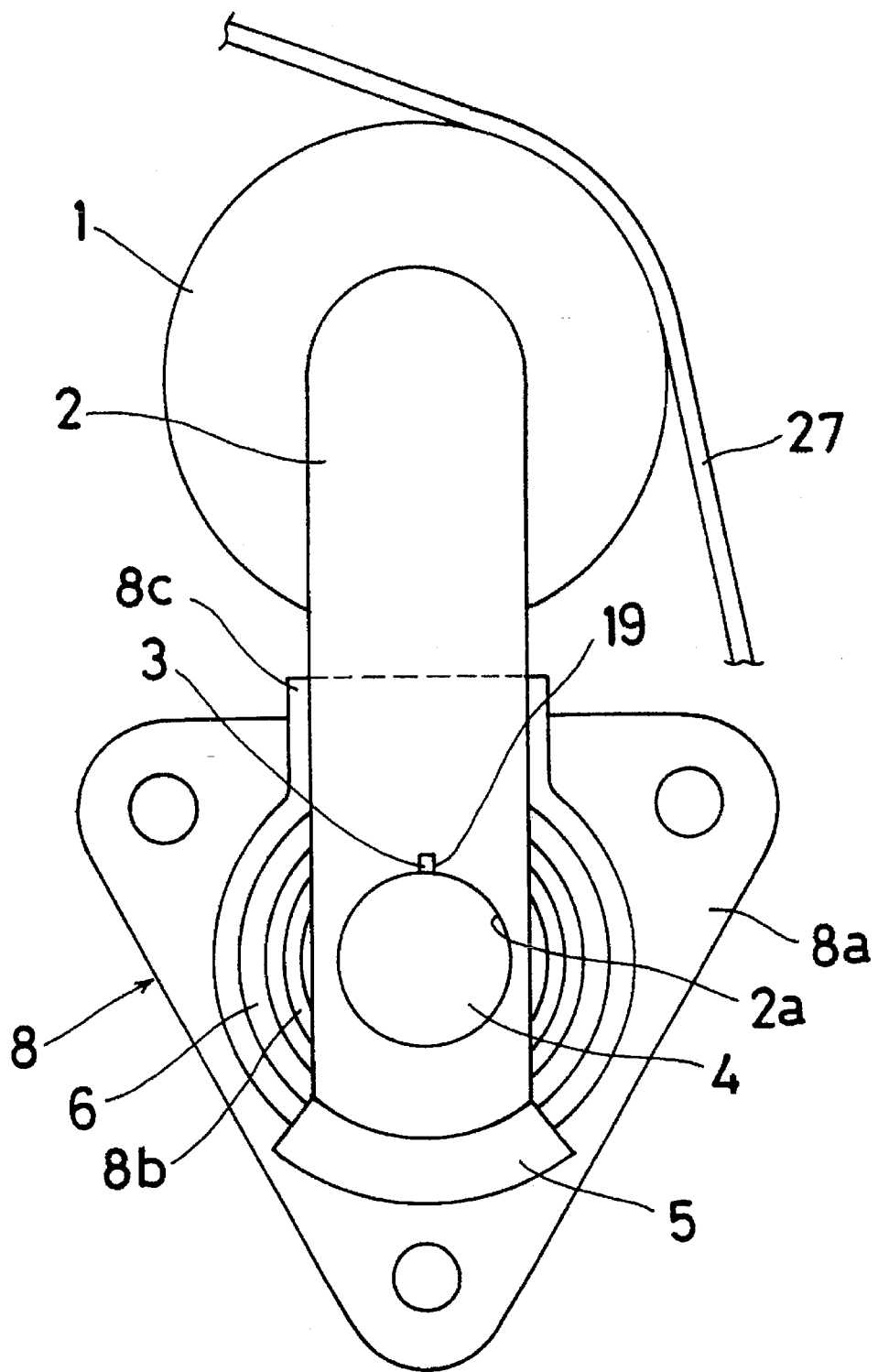
FIG. 2 is a side view of a first embodiment of an auto-tensioner shown in FIG. 1.

Referring now to FIGS. 1 and 2, an auto-tensioner is provided with a body 8 having a flange portion 8a which is fixed to a cylinder block of an engine (not shown), a cylindrical portion 8b projecting from the flange portion and a projecting portion 8c outwardly projecting from a part of an outer circumferential portion of the cylindrical portion 8b. The cylindrical portion 8b is provided with a stepped inner bore 18 having a large diameter portion whose one end is open and a small diameter portion whose end is closed.

A stepped-shaped shaft 4 is slidably and rotatably fitted into the inner bore 18 of the cylindrical portion 8b and has a small diameter portion 4a and a large diameter portion 4b which correspond to the small and large diameter portions of the inner bore 18. A pressure chamber 11 and a fluid chamber 17 are defined in the inner bore 18 by the shaft 4. The pressure chamber 11 is located in the small diameter portion of the inner bore 18. The fluid chamber 17 is located in the large diameter portion of the inner bore 18 and is formed by a circular space defined between a stepped portion 4a of the shaft 4, an inner circumferential surface of the large diameter portion of the inner bore 18 and a stepped portion of the shaft 4.

The small diameter portion 4a of the shaft 4 is fitted into the small diameter portion of the inner bore 18 with a small gap 10 which corresponds to a small passage of the present invention. Therefore, the pressure chamber 11 always communicates with the fluid chamber 17 through the small gap 10. In a circular grove 8b1, formed on the end portion of the cylindrical portion 8b, a seal member 7 is disposed therein to be fluid-tight. Further, the seal member 7 is in contact with the outer circumferential surface of the large diameter 4b of the shaft 4 fluid-tight so that the pressure chamber 11, the fluid chamber 17 and the reservoir chamber 13 are sealed.

In the projecting portion 8c, a hollow portion 8c1, initially open to the outside, is formed. The opening of the hollow portion 8c1 is closed by a cover 15 that is fixed to the inner surface of the hollow portion 8c1 so as to be fluid-tight. The reservoir chamber 13 is thus formed in the hollow portion 8c1 of the projecting portion 8c. This reservoir chamber 13 is located above the pressure chamber 11 and the fluid chamber 17 when the body 8 is fixed to a cylinder block of an engine (not shown).

A first passage 16 which communicates between the pressure chamber 11 and the reservoir chamber 13 is formed in a connecting part between the cylindrical portion 8b and the projecting portion 8c of the body 8. This first passage 16 corresponds to the passage of the present invention. A second passage 20, which always communicates between the reservoir chamber 13 and the fluid chamber 17 is formed in the connecting part between the cylindrical portion 8b and the projecting portion 8c of the body 8. The pressure chamber 11, the fluid chamber 17, the first passage 16 and the second passage 20 are filled with viscous fluid. Furthermore, viscous fluid and air are filled in the reservoir chamber 13, therefore forming an air layer above a fluid layer in the reservoir chamber 13. The fluid layer in the reservoir chamber 13 communicates with the viscous fluid in the pressure chamber 11 and the fluid chamber 17 through the first and second passages 16, 20, respectively.

A check valve 12 is disposed in the first passage 16 and includes a seat member 12a fixed in the first passage 16. A communicating hole is defined between the reservoir chamber 13 and the first passage 16. A check ball 12b is used to close a hole 12a1 formed in the seat member 12a with a retainer 12c for holding the ball valve 12b. The seat member 12a is fixed in a circular groove which is formed on an opening portion of the first passage 16. The retainer 12c has a flange portion which is nipped between the seat member 12a and a bottom surface of the circular groove of the first passage 16 and a cylindrical projecting portion. The check ball 12b is disposed in the cylindrical projecting portion of the retainer 12c so as to be able to move in the axial direction. Plural slits are formed in the cylindrical projecting portion of the retainer 12c. The viscous fluid can, therefore, flow from the reservoir chamber 13 into the pressure chamber 11 through the hole of the seat member 12a, the slits of the retainer 12c and the first passage 16 when the check ball 12b does not close the hole of the seat member 12a. The check ball 12b is moved by the pressure difference between the pressure chamber 11 and the reservoir chamber 13 and the force of the viscous fluid flowing through. Therefore, the check valve 12 interrupts the fluid communication from the pressure chamber 11 to the reservoir chamber 13 through the first passage 16, and allows the fluid communication from the reservoir chamber 13 to the pressure chamber 11 through the first passage 16.

A screwthread 9a, having a large lead, is formed on the inner circumferential surface of the large diameter portion of the inner bore 18, located in the fluid chamber 17. A corresponding screwthread 9b, having a large lead, is formed on the outer circumferential surface of the small diameter portion 4a of the shaft 4 positioned in the fluid chamber 17. The screwthreads 9b are engaged with the screwthreads 9a. This allows the shaft 4 to move in the axial direction when the shaft 4 is rotated relative to the body 8. Namely, the screwthreads 9a, 9b correspond to the converting means 9 of the present invention. Now, these inter-engaging screwthreads 9a, 9b are formed as to be separated from the stepped portion of the inner bore 18 in order to allow the shaft 4 to move axially toward the pressure chamber 11.

One end of the large diameter portion 4b of the shaft 4 projects from the inner bore 18, and is fitted into a hole 2a formed on an arm 2. An axial groove 4c is formed on the projecting portion of the shaft 4, with a key member 3 fitted into the groove 4c so as to move with the shaft 4. An axial groove 19 is formed on an inner surface of the hole 2a of the arm 2; the key member 3 is fitted into the groove 19. As a result, the shaft 4 is connected to the arm 2 so as to be able to axially move relative to the arm 2, while not being able to rotate relative to the arm 2.

As shown in FIG. 2, an upper end of the arm 2 supports a pulley 1, whereby the pulley 1 is able to rotate. The pulley 1 is positioned in contact with a belt (e.g., a timing belt) 27 along its outer circumferential surface. In operation, the arm 2 rotates with the movement of the pulley 1 as the tension of the belt 27 with the pulley 1 changes. At an outer circumferential portion of the cylindrical portion 8b of the body 8, a spring 6 is positioned with one end (not shown) connected to the arm 2 and the other end (not shown) connected to the body 8. The spring 6 therefore generates a spring rotational force to the arm 2 so that the pulley 1 presses onto the belt 27. The spring 6 corresponds to the urging means for the present invention. A circular flange portion 8d (see FIG. 1) projects from the outer circumferential surface of the body 8. A circular arc-shaped guide member 5 is fixed to the circular flange portion 8d at one end, and to the lower end of the arm 2 at its other end, thereby preventing any play in the arm 2.

The above-described embodiment of the auto-tensioner operates as follows: the pulley 1 is constantly pressed onto the belt 27 by the urging force of the spring 6 so as to apply the proper amount of tension to the belt 27.

If the tension in the belt 27 suddenly increases, a rotational force which makes the arm 2 rotate counterclockwise will correspondingly act on the arm 2 against the urging force of the spring 6. At this point, through the action of the converting means 9, this rotational force is converted into an axial force which makes the shaft 4 slide toward the pressure chamber 11. As a result, the pressure in the pressure chamber 11 increases, causing the check valve 12 to close the first passage 16. Consequently, the viscous fluid in the pressure chamber 11 slowly flows into the fluid chamber 17 through the small gap 10. Accordingly, a large resistance or force is generated on the shaft 4 against the axial movement of the shaft 4 and, therefore, the net movement of the shaft 4 and the arm 2 is slow. As a result, the pulley 1 gradually follows the movement of the belt 27 when the tension of the belt suddenly increases, thereby preventing the belt 27 from vibrating.

On the other hand, if the belt 27 suddenly or rapidly becomes loose, the urging force of the spring 6 will generate a rotational force which will make the arm 2 rotate clockwise. The converting means 9 will then convert the rotational force into an axial force which will make the shaft 4 slide outward or to the right relative to FIG. 1. As a result, the pressure in the pressure chamber 11 decreases and the check valve 12 opens the first passage 16. The viscous fluid in the reservoir chamber 13 therefore flows into the pressure chamber 11 through the first passage 16 and past the check valve 12. Accordingly, the resistance against the movement of the shaft 4 decreases. The arm 2 can then quickly rotate through the urging force of the spring 6, allowing the pulley 1 to quickly follow and compensate for the looseness of the belt 27, whereby the tension of the belt 27 decreases.

As mentioned above, when the check valve 12 is closed, viscous fluid in the pressure chamber 11 flows into the fluid chamber 17 through the small gap 10. Since the outer circumferential surface of the small diameter portion 4a of the shaft 4 and the small diameter portion of the inner bore 18 forming the small gap 10 do not receive the load in the circumferential direction when axial force is exerted on the shaft 4 through the action of the converting means 9, the above portions forming the small gap 10 do not wear down easily, whereby the cross-sectional area of the small gap 10 and the flux of viscous fluid through the small gap 10 do not easily change and degrade over time. Therefore, the overall operating characteristics of the auto-tensioner also do not change or degrade during its use over time.

Furthermore, since air and viscous fluid are filled in the reservoir chamber 13 which communicates with the fluid chamber 17, when the volume of the viscous fluid in the pressure chamber 11 and the fluid chamber 17 change as a result of changes in temperature and the changes in the volume of the fluid chamber caused by the movement of the shaft 4, the change in the volume of viscous fluid is absorbed by the air in the reservoir chamber 13. Accordingly, excessive pressure from the viscous fluid acting on the seal member 7 does not occur.

Figure 3:
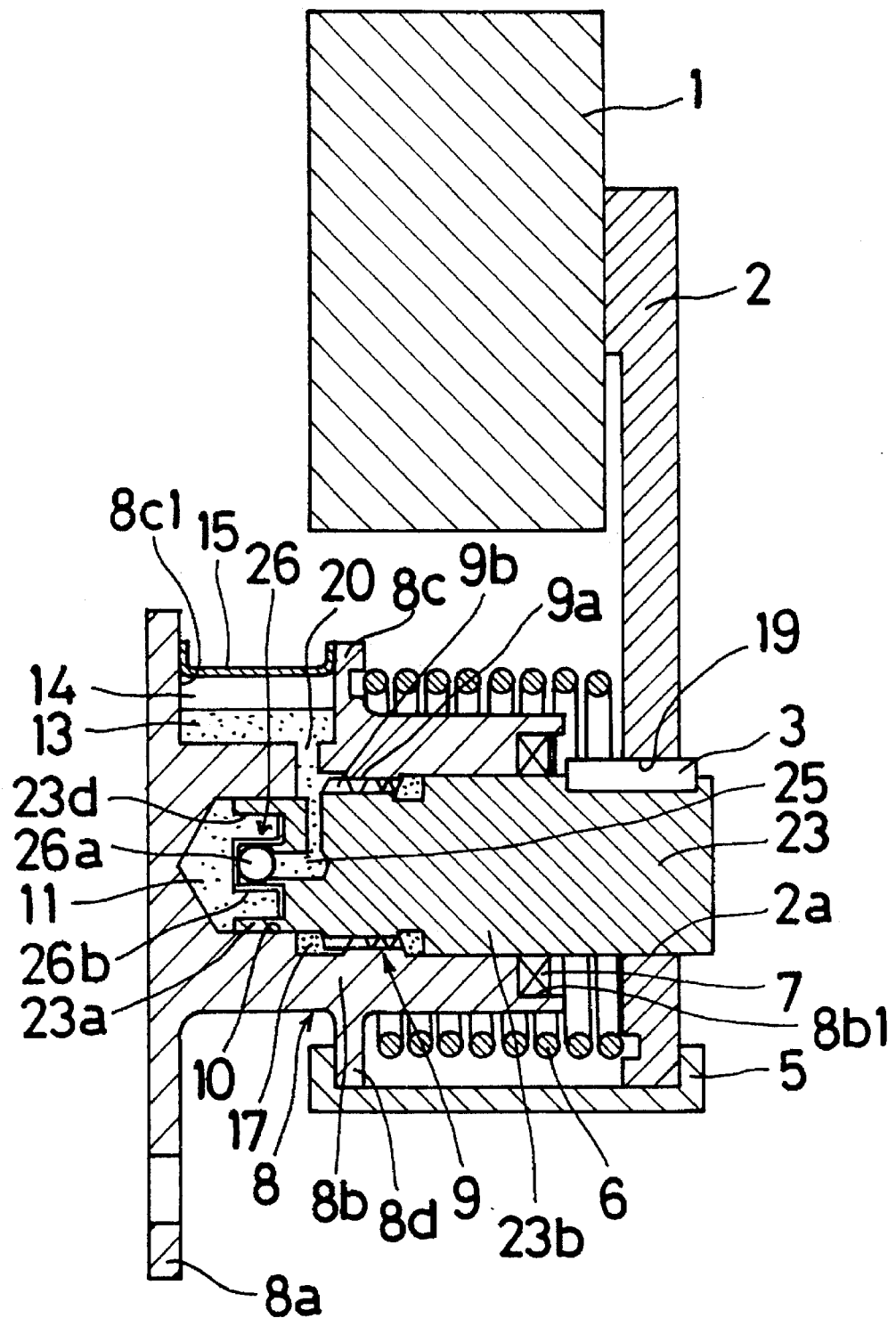
FIG. 3 is a sectional view of a second embodiment of an auto-tensioner in accordance with the present invention.

FIG. 3 shows a second embodiment of the present invention. In FIG. 3, the same parts as those in FIG. 1 are identified by the same reference numerals. A passage 25 which connects between the pressure chamber 11 and the fluid chamber 17 is formed in the shaft 4. A hollow portion 23d is formed on an end surface of the small diameter portion 23a of the shaft 23 opposite the pressure chamber 11. A check valve 26 is disposed in the hollow portion 23. The check valve 26 includes a check ball 26a and a retainer 26b. The retainer 26b is fixed in the hollow portion 23d at its flange portion and includes a cylindrical portion having plural slits and a bottom. The check ball 26a is disposed in the cylindrical portion of the retainer 26b so as to be movable in the axial direction. On a bottom surface of the hollow portion 23d, a cylindrical projection of the shaft 23 projects into the cylindrical portion of the retainer 26b, forming part of the passage 25. The check ball 26a is moved by the pressure difference between the pressure chamber 11 and the fluid chamber 17 and by the force of the viscous fluid flowing. The check ball 26a contacts with a circular end surface of the cylindrical projection of the shaft 23 so as to close the passage 25. The check valve 26 interrupts the fluid communication from the pressure chamber 11 to the fluid chamber 17 through the passage 25, while allowing fluid communication from the fluid chamber 17 to the pressure chamber 11 through the passage 25. The other parts are the same as the above first embodiment.

As set forth in the above discussion, the second embodiment is able to obtain the same effects as the first embodiment. Namely, when the tension of the belt suddenly increases, the pressure in the pressure chamber 11 increases and therefore the check valve 26 closes the passage 25. The viscous fluid in the pressure chamber 11 in turn slowly forms into the fluid chamber 17 only through the small gap 10. Accordingly, a large resistance is generated to act on the shaft 4 against the axial movement of the shaft 23, thereby causing the movement of the shaft 23 and the arm 2 to be relatively slow. As a result, the pulley 1 gradually follows the movement of the belt whose tension suddenly increases, thereby preventing the belt from vibrating.

On the other hand, when the belt suddenly or rapidly becomes loose, the pressure in the pressure chamber 11 decreases and the check valve 26 opens the passage 25. The viscous fluid in the fluid chamber 17 flows into the pressure chamber 11 through the passage 25 and the check valve 26. Accordingly, the resistance against the movement of the shaft 23 decreases. The arm 2 then quickly rotates as a result of the urging force of the spring 6, and the pulley 1 is able to quickly follow and compensate for the looseness of the belt so that the tension of the belt is decreased.

As with the first embodiment, the auto-tensioner, according to the second embodiment, is able to prevent excessive pressure from the viscous fluid acting on the seal member 7 and to avoid the degradation of its operating characteristics over time during its use.

In the above-mentioned embodiments, when the pressure chamber 11 is under pressure, the viscous fluid in the pressure chamber 11 flows into the fluid chamber 17 through the small gap 10 between the small diameter portion 4a of the shaft 4 and the small diameter portion of the inner bore 18. However, it is possible to form an orifice passage which communicates between the pressure chamber 11 and the fluid chamber 17 or the reservoir chamber 13. The orifice passage may be formed, for example, on the shaft 4 or the body 8. If considered from the standpoint of manufacturing costs and space, the above small gap 10 is a better alternative to such an orifice passage. In any case, the structure and operation of the auto-tensioner according to the present invention prevents the cross-sectional area of the small gap 10 or the orifice passage and the flux of viscous fluid through the small gap 10 or the orifice passage from changing or degrading over time. Therefore, changes in or degradation of the overall characteristics of the auto-tensioner during its use over time are prevented.

As mentioned above, an auto-tensioner, according to the present invention, can improve the durability of the seal portion for sealing viscous fluids and can then again prevent changes in or degradation of the characteristics of the auto-tensioner during its use over time.

The principles, preferred embodiments and modes of operation of the present invention have been described in the foregoing description. The invention, which is intended to be protected herein, should not, however, be construed as limited to the particular forms disclosed, as these are to be regarded as illustrative rather than restrictive. Variations and changed may be made by those skilled in the art without departing from the spirit of the present invention. Accordingly, the foregoing detailed description should be considered exemplary in nature and not limited to the scope and spirit of the invention as set forth in the appended claims.

What is claimed is:

1. An auto-tensioner comprising:

a body having a cylindrical bore defined therein;

a shaft having first and second ends, the first end of said shaft being slidably and rotatably engaged with the cylindrical bore of said body, said body including means for sealing said shaft in the cylindrical bore so as to be fluid-tight;

a support arm having upper and lower ends, the lower end of said support arm being fixedly connected to the second end of said shaft;

a pulley rotatably connected to the upper end of said support arm, said pulley being operatively engaged with a belt under tension;

means for rotatively urging said shaft and said support arm whereby said support arm maintains a tension engagement between said pulley and said belt, said urging means being operatively connected between said body and said shaft; and means for converting rotational movement of said shaft into axial movement thereof along the cylindrical bore, said converting means operatively connected between said shaft and said body, wherein said cylindrical bore includes an inner end and an outer end, the inner end of said cylindrical bore being formed so as to define a pressure chamber and a fluid chamber between the inner end of the cylindrical bore and the first end of said shaft, the pressure and fluid chambers are further formed so as to define a narrow fluid passage therebetween, the pressure and fluid chambers are filled with a viscous fluid, said body has a reservoir chamber defined therein and formed so as to be located above said pressure and fluid chambers, said reservoir chamber is filled with viscous fluid and gas, a first main fluid passage is defined in said body to communicatively connect the pressure chamber with said reservoir chamber, and a second main fluid passage is defined in said body to communicatively connect the fluid chamber with said reservoir chamber; and valve means located in said first fluid passage for selectively controlling fluid communication of said pressure and fluid chambers with each other and with said reservoir chamber.

2. An auto-tensioner according to claim 1, wherein the converting means comprises first and second screwthreads defined on said shaft and in the cylindrical bore of said body respectively, said first and second screwthreads operatively inter-engaging with each other when said shaft is engaged in the cylindrical bore.

3. An auto-tensioner according to claim 1, wherein the narrow fluid passage between the pressure chamber and the fluid chamber comprises a gap between an outer surface of the first end of said shaft and a surface of the inner end of said cylindrical bore.

4. An auto-tensioner according to claim 1, wherein the inner end of the cylindrical bore comprises first and second portions, the first portion defining the pressure chamber and having a diameter smaller than a diameter of the second portion, the second portion of the cylindrical bore having the second screwthreads defined thereon, the first end of the shaft comprises first and second portions, the first portion having a diameter smaller than a diameter of the second portion and corresponding to the diameter of the first portion of the inner end of the cylindrical bore, the second portion of the first end of the shaft having a diameter corresponding to the diameter of the second portion of the inner end of the cylindrical bore and having the first screwthreads defined thereon to inter-engage with the second screwthreads on the shaft, and the narrow fluid passage between the pressure and fluid chambers is defined by the first portion of the first end of the shaft and the first portion of the inner end of the cylindrical bore.

5. An auto-tensioner comprising:

a body having a cylindrical bore defined therein;

a shaft having first and second ends, the first end of said shaft being slidably and rotatably engaged with the cylindrical bore of said body, said body including means for sealing said shaft in the cylindrical bore so as to be fluid-tight;

a support arm having upper and lower ends, the lower end of said support arm being fixedly connected to the second end of said shaft;

a pulley rotatably connected to the upper end of said support arm, said pulley being operatively engaged with a belt under tension;

means for rotatively urging said shaft and said support arm whereby said support arm maintains a tension engagement between said pulley and said belt, said urging means being operatively connected between said body and said shaft; and means for converting rotational movement of said shaft into axial movement thereof along the cylindrical bore, said converting means operatively connected between said shaft and said body, wherein said cylindrical bore includes an inner end and an outer end, the inner end of said cylindrical bore being formed so as to define a pressure chamber and a fluid chamber between the inner end of the cylindrical bore and the first end of said shaft, the pressure and fluid chambers are further formed so as to define a narrow fluid passage therebetween, the pressure and fluid chambers are filled with a viscous fluid, said body has a reservoir chamber defined therein and formed so as to be located above said pressure and fluid chambers, said reservoir chamber is filled with viscous fluid and gas, and a main fluid passage is defined in said shaft to communicatively connect the pressure chamber with said fluid and reservoir chambers; and valve means located in said main fluid passage for selectively controlling fluid communication of said pressure and fluid chambers with each other and with said reservoir chamber.

\* \* \* \* \*